3,228,842
TRANSPARENT MINERAL OIL-WATER GELS
William R. Markland and Frank D. Doca, Clinton, and Philip Tusa, Trumbull, Conn., assignors to Chesebrough-Pond's Inc., a corporation of New York
No Drawing. Filed Mar. 14, 1963, Ser. No. 265,070
10 Claims. (Cl. 167—87)

This invention relates to transparent gels containing generous amounts of both mineral oil and water and, particularly, to improved hairdressing preparations in the form of transparent mineral oil-water gels.

Transparent gels, by our definition, are transparent, homogenous, jelly-like solids. They are transparent to the degree that newsprint can be read through an extrusion of the gel squeezed from a collapsible tube with an 11 mm. opening. They are solid to the degree that they maintain their shape and cannot be poured from a container (i.e., once gelation has taken place). In addition, a containerful will have "ring" or resonance when this containerful is tapped or gently bounced. In other words, when this is done, one can feel vibrations passing through the gel. In contrast, liquids or typical cosmetic creams or ointments do not have this "ring" or resonance. Thus, gel "ring" offers a distinctive characteristic not available in other cosmetic or hairdressing preparations.

Mineral oil has long been the prime ingredient of choice for hairdressing preparations. It offers unique and distinctive advantages in respect to hairgrooming. Mineral oil is an effective hair-holding material, particularly at higher viscosities (i.e., 120 Saybolt seconds and above). It has excellent emolliency and lubricity and none of the tackiness typical of some other oils and synthetic oils. It is bland and innocuous to the skin and, finally, it is highly resistant to air-oxidation and rancidity and is inexpensive.

Water is also an important hairdressing ingredient. It is a valuable temporary (i.e., evaporating) diluent which can appreciably aid in spreading a hairdressing on the hair and scalp and aid in giving hair an initial "set." It contributes a desirable wetness of feel and appreciably reduces both the real and the apparent oiliness-greasiness of a hairdressing.

Thus, our invention relates to unique and novel combinations of mineral oil, preferably of high viscosity, and water in the form of transparent gels with good gel "ring" to provide superior hairdressing preparations.

Objects and advantages of the invention will be set forth in part hereinafter and in part will be obvious herefrom, or may be learned by practice with the invention, the same being realized and attained by means of the steps, methods and compositions, pointed out in the appended claims.

The invention consists in the novel steps, methods and compositions herein shown and described.

It is an object of this invention to provide a transparent mineral oil-water gel containing generous amounts of mineral oil and water. Another object of this invention is to provide an improved hairdressing preparation in the form of a transparent mineral oil-water gel.

Yet another object of this invention is to provide a transparent mineral oil-water gel hairdressing preparation which maintains its transparency and homogeneity over a wide range of temperature conditions (25–110° F.). A still further object of this invention is to provide a hairdressing preparation in the form of a transparent mineral oil-water gel which has good gel "ring" and retains this "ring" upon return to room temperature after prolonged exposure to a wide range of temperature conditions (25–110° F.).

A still further object of this invention is to provide a transparent mineral oil-water gel hairdressing preparation which is colorless or essentially colorless, thus permitting the preparation to be colored as desired by the incorporation of water-soluble or oil-soluble dyes.

Another object of this invention is to provide a transparent mineral oil-water gel hairdressing preparation which is odorless, or essentially odorless, thus permitting the preparation to be perfumed as desired.

Another object of this invention is to provide a hairdressing preparation in the form of a transparent mineral oil-water gel which exhibits an outstanding hairdressing performance, that is, exhibits good hair-holding qualities; imparts emolliency to scalp; imparts a lubricated feel to the hair; imparts good lustre to the hair; exhibits easy, pleasant application to the air; rinses off easily from the hands with plain water following application and permits "regrooming" hours after application by combing with a wet comb.

Yet another object of this invention is to provide a hairdressing preparation in the form of a transparent mineral oil-water gel which is essentially free of skin irritation and essentially free of eye irritation, particularly, corneal toxicity.

A still further object of this invention is to provide a hairdressing preparation in the form of a transparent mineral oil-water gel which will function both as a hairdressing and as a hair and scalp cleanser.

It has been found that the objects of this invention may be realized by combining, in appropriate amounts to form a gel, mineral oil, water and a combination of an ethoxylated oil-soluble emulsifier and an ethoxylated water-soluble emulsifier, the degree of ethoxylation of said oil-soluble emulsifier being in the range of 0.5 to 4.0 dendro and the degree of ethoxylation of said water-soluble emulsifier being in the range of 16 to 24 dendro.

As indicated hereinbefore, the water-soluble and oil-soluble emulsifiers used in accordance with this invention are ethoxylated materials. In discussing ethoxylated materials, the length of ethoxy chain is frequently referred to as degree of ethoxylation or as moles of ethylene oxide added per mole of starting material. The term "dendro," meaning ethylene oxide residue (i.e., $CH_2CH_2O$), is useful in naming these materials. Thus, 4-dendro oleyl alcohol refers to the commercially available fatty alcohol in which oleyl predominates, ethoxylated to the extent that the average of the distribution is at 4 moles of ethylene oxide residues.

It has been found that excellent transparent mineral oil-water gel hairdressings having the desired properties mentioned hereinbefore may be formed when the oil-soluble component is selected from the group consisting of ethoxylated oleyl or ethoxylated oleyl-cetyl alcohol mixture, the degree of ethoxylation of said emulsifier being in the range of about 0.5 to 4.0 dendro; preferably 2 dendro. The oleyl-cetyl ratios can be varied from 100% oleyl to about 60:40 by weight oleyl-cetyl, the preferred mixture containing at least 70 parts oleyl alcohol per 100 parts of mixture.

The water-soluble emulsifier used in accordance with this invention is selected from the group consisting of ethoxylated lanolin alcohols and ethoxylated hydrogenated lanolin wherein the degree of ethoxylation is in the range of about 16 to 24 dendro, preferably 20 dendro. It is preferred that the water-soluble emulsifier be ethoxylated hydrogenated lanolin, since such hydrogenated emulsifiers are very light colored and essentially odorless.

Hydrogenated lanolin is the high pressure reaction product of lanolin and hydrogen. A typical commercial hydrogenated lanolin is that sold under the trade name "Hydrolan." This material is white in color and has the following chemical and physical constants:

Melting point, ° C. _____ 48–50
Specific gravity, 60° C. _____ 0.858–0.867

| | |
|---|---|
| Viscosity, 210° F., Saybolt | 46–50 |
| Acid value, max. | 0.2 |
| Saponification value, max. | 6 |
| Iodine value | 12–15 |
| Unsaponifiables, percent | 94–98 |

The high pressure hydrogenation apparently not only saturates unsaturated bonds, but also converts carboxyl groups to hydroxyl groups. The reaction product of ethylene oxide and hydrogenated lanolin is referred to herein as ethoxylated hydrogenated lanolin. The preferred range of hydroxyl value for ethoxylated hydrogenated lanolin (20 dendro) is 35–45.

It was quite surprising to us that ethoxylated hydrogenated lanolin could be used to prepare transparent mineral oil-water gels with good gel "ring" even after it was discovered ethoxylated lanolin alcohols (non-hydrogenated) were effective in this regard. The normal prediction would be that hydrogenation of lanolin to a state of appreciable saturation would alter solubility characteristics to a degree sufficient to make the material unusable in this application.

The aforedescribed oil-soluble emulsifier and water-soluble emulsifier exhibit considerable mutual solubility. Moreover, the oil-soluble emulsifier has some degree of water solubility, while the water-soluble emulsifier has some degree of oil solubility.

Moreover, the aforedescribed oil-soluble and water-soluble emulsifiers are especially low in skin and eye irritation propensity—particularly corneal toxicity. It is in respect to eye irritation and corneal toxicity that the 2 dendro oleyl and 2 dendro oleyl-cetyl alcohol mixtures and the approximately 20 dendro hydrogenated lanolin are preferred.

The viscosity of the mineral oil used in this invention can be varied from a light viscosity grade (e.g., 70 Saybolt seconds or less) to a heavy viscosity grade (e.g., 350 Saybolt seconds) to obtain the desired properties regarding hairgrooming qualities, lack of irritation, etc.

The preferred mineral oils are the higher viscosity mineral oils, preferably mineral oils having a viscosity of about 180 Saybolt seconds, since the heavier oils provide better hairholding and hairgrooming and because increasing viscosity tends to decrease eye irritation and corneal toxicity.

As a preferred embodiment of this invention, there is included in the mineral oil-water mixture, a coupling agent which serves to enhance and maintain the transparency of the mineral oil-water gel. The coupling agent has some degree of mutual solubility in the mineral oil, water and emulsifier components. Examples of compounds suitable for this purpose are hydroxyl compounds containing at least two hydroxyl groups such, for example, as hexylene glycol, 2-ethyl-1,3-hexanediol, 2-methyl-2-ethyl-1,3-propanediol, glycerine, polyethylene glycol 600, polyethylene glycol 1500, propylene glycol monomethyl ether, dipropylene glycol monomethyl ether, isopropylidene glycerol, and dipropylene-glycol.

For the most part, the above coupling agents also act as softening agents to affect and control consistency, spreadability on the skin and hair, etc.

Also, adjuvant materials such as perfume, color, preservatives, bacteriostatic agents, etc. can be included.

As will be readily understood by those in the field, the amounts of oil-soluble emulsifier and/or water-soluble emulsifier required for the production of the desired transparent hairdressing preparations will vary depending upon many factors. For example, the amount of a particular oil-soluble emulsifier that is employed will vary depending upon: (1) the amount of mineral oil that is present, (2) the amount of water that is present, (3) the chemical nature and hydrophile-lipophile balance of said oil-soluble emulsifier, (4) the chemical nature, hydrophile-lipophile balance and amount of the water-soluble emulsifier that is employed.

In general, the mineral oil is in an amount from about 15 to 30%, preferably 18–25%, by weight of the total composition, in order to provide the desired degree of hair-holding and hair-grooming.

In general, moreover, water is in an amount from about 40 to 60%, preferably 40–55%, by weight of the total composition, in order to provide the desired degree of hair "set," wetness of feel and reduction of real and apparent oiliness-greasiness.

In general, the oil-soluble and water-soluble emulsifiers are in such amounts that the final "HLB" value of the emulsifier combination is in the range of 10.5 to 12.0. As is well-known to those in the art, "HLB" is an abbreviation of the term "hydrophile-lipophile balance." This is a system for classifying emulsifying agents according to the size and the strength of hydrophilic and lipophilic groups comprising the molecule. An emulsifier that is predominantly hydrophilic, such, for example, as the water-soluble emulsifier ethoxylated in the range of 16–24 dendro, used in accordance with this invention, has a relatively high HLB value, about 12.7 to 15.0. If the emulsifier is predominantly lipophilic, such, for example, as the oil-soluble emulsifier ethoxylated in the range of 0.5 to 4 dendro, the HLB value is relatively low, about 1.6 to 7.6.

As shown in the specific examples given hereinafter, excellent results have been obtained when the total amount of oil-soluble and water-soluble emulsifier at least equals the amount of mineral oil that is present, and wherein the amount of water-soluble emulsifier is at least equal to the amount of oil-soluble emulsifier. In general, when a coupling-softening agent is employed, it is in an amount up to 15%, preferably 0.5 to 10%, by weight of the total composition.

In forming the transparent oil-water gels of this invention, different techniques may be used in forming the gels. For example, both the oil-soluble and water-soluble emulsifiers (and coupling-softening agent if used) may be incorporated in the mineral oil with stirring, and the resulting composition heated to elevated temperatures, e.g., 170° F., to effect better solution or dispersion after which water is added with stirring. Upon cooling, a gel is formed. The temperature at which solidification or gelation takes place is the gel point. Mixtures with gel points between 115 and 125° F. are preferred because, generally speaking, such mixtures have the desired degree of softness after gelation has occurred. Moreover, such mixtures can be held conveniently and without deterioration at temperatures above the gel point while being poured liquid into containers. On the other hand, gel points between 115 and 125° F. are not so low that there is a risk of the mixtures liquefying in the filled container under conditions of typical summer temperatures.

Instead of incorporating the water-soluble emulsifier in the mineral oil, it may be added to the water that is mixed with the heated mineral oil containing the oil-soluble emulsifier. With respect to any additives that may be included, in general, the oil-soluble components are incorporated in the mineral oil while the water-soluble components are added to the water portion prior to mixing with the mineral oil.

Example 1

The following is a formulation of a transparent mineral-oil-water gel formed in accordance with the present invention:

| | |
|---|---|
| Mineral oil, 90 vis. | 20 |
| Ethoxylated hydrogenated lanolin (20 dendro) | 15 |
| Ethoxylated oleyl-cetyl (7:3) alcohols (4 dendro) | 10 |
| Preservative, color, perfume, q.s. | |
| Water, q.s. to 100%. | |

The above gel may be prepared as follows:

Mix the mineral oil, emulsifiers and preservatives and heat to 170° F. with stirring. Heat the water and color to 170° F. and add slowly with stirring to the emulsifier mineral oil mixture, cool with stirring to about 140° F. (just above the gel point), add perfume, water loss, stir and pour.

In the above formulation, as well as the formulations which follow, references to "90 vis." means a viscosity of 90 Saybolt seconds at 100° F.

The following examples are formulations of transparent mineral oil-water gels formed in accordance with this invention. These compositions may be prepared in accordance with the method described in detail in Example 1.

Example 2

| | |
|---|---|
| Mineral oil, 90 vis. | 25 |
| Ethoxylated hydrogenated lanolin (20 dendro) | 15 |
| Ethoxylated oleyl alcohol (2 dendro) | 13 |
| Hexylene glycol | 5 |
| Preservative, color, perfume, q.s. | |
| Water, q.s. to 100%. | |

Example 3

| | |
|---|---|
| Mineral oil, 90 vis. | 25 |
| Ethoxylated hydrogenated lanolin (20 dendro) | 21 |
| Ethoxylated oleyl alcohol (2 dendro) | 9 |
| Polyethylene glycol 600 | 7 |
| Preservative, color, perfume, q.s. | |
| Water, q.s. to 100%. | |

Example 4

| | |
|---|---|
| Mineral oil, 180 vis. | 21 |
| Ethoxylated hydrogenated lanolin (20 dendro) | 15 |
| Ethoxylated oleyl alcohol (2 dendro) | 10 |
| Polyethylene glycol 1500 | 2 |
| 2-ethyl-1,3-hexanediol | 2 |
| Glycerine | 2 |
| Preservative, color, perfume, q.s. | |
| Water, q.s. to 100%. | |

Example 5

| | |
|---|---|
| Mineral oil, 180 vis. | 21 |
| Ethoxylated hydrogenated lanolin (20 dendro) | 15 |
| Ethoxylated oleyl-cetyl (7:3) (2 dendro) | 10 |
| 2-ethyl-1,3-hexanediol | 2 |
| Polyethylene glycol 1500 | 2 |
| Glycerine | 2 |
| Preservative, color, perfume, q.s. | |
| Water, q.s. to 100%. | |

Example 6

| | |
|---|---|
| Mineral oil, 90 vis. | 23 |
| Ethoxylated hydrogenated lanolin (20 dendro) | 16 |
| Ethoxylated oleyl-cetyl (7:3) alcohol (2 dendro) | 10 |
| 2-ethyl-1,3-hexanediol | 2 |
| Polyethylene glycol 600 | 2 |
| Preservative, color, perfume, q.s. | |
| Water, q.s. to 100%. | |

Example 7

| | |
|---|---|
| Mineral oil, 340 vis. | 22 |
| Ethoxylated hydrogenated lanolin (20 dendro) | 15 |
| Ethoxylated oleyl alcohol (2 dendro) | 10 |
| Polyethylene glycol 1500 | 5 |
| Polyethylene glycol 600 | 3 |
| 2-ethyl-1,3-hexanediol | 2 |
| Preservative, color, perfume, q.s. | |
| Water, q.s. to 100%. | |

Example 8

| | |
|---|---|
| Mineral oil, 90 vis. | 25 |
| Ethoxylated hydrogenated lanolin (20 dendro) | 16 |
| Ethoxylated oleyl-cetyl (7:3) alcohol (4-dendro) | 9 |
| Polyethylene glycol 1500 | 3 |
| Preservative, color, perfume, q.s. | |
| Water, q.s. to 100%. | |

Example 9

| | |
|---|---|
| Mineral oil, 90 vis. | 25 |
| Ethoxylated hydrogenated lanolin (20 dendro) | 16 |
| Ethoxylated oleyl-cetyl (7:3) alcohol (4 dendro) | 9 |
| Polyethylene glycol 1500 | 3 |
| Preservative, color, perfume, q.s. | |
| Water, q.s. to 100%. | |

Example 10

| | |
|---|---|
| Mineral oil, 90 vis. | 23 |
| Ethoxylated hydrogenated lanolin (20 dendro) | 14 |
| Ethoxylated oleyl-cetyl (7:3) alcohol (4 dendro) | 10 |
| 2-ethyl-1,3-hexanediol | 1 |
| Preservative, color, perfume, q.s. | |
| Water, q.s. to 100%. | |

Example 11

| | |
|---|---|
| Mineral oil, 90 vis. | 25 |
| Ethoxylated lanolin alcohol (16 dendro) | 15 |
| Ethoxylated oleyl-cetyl (7:3) alcohol (4 dendro) | 10 |
| Preservative, color, perfume, q.s. | |
| Water, q.s. to 100%. | |

The invention in its broader aspects is not limited to the specific steps, methods and compositions described but departures may be made therefrom within the scope of the accompanying claims without departing from the principles of the invention and without sacrificing its chief advantages.

What is claimed is:

1. A transparent oil-water gel which is particularly useful as a hairdressing preparation comprising; mineral oil, of a viscosity in the range of 70–350 Saybolt seconds, in an amount from about 15 to 30% by weight, water in an amount from about 40 to 60% by weight, and a combination of an oil-soluble emulsifier and a water-soluble emulsifier in an amount from about 15 to 30% by weight, said oil-soluble emulsifier being selected from the group consisting of ethoxylated oleyl alcohol and an ethoxylated oleyl-cetyl alcohol mixture, wherein the amount of oleyl alcohol in the oleyl-cetyl alcohol mixture is at least 60% by weight, the degree of ethoxylation of said oil-soluble emulsifier being in the range of 0.5 to 4.0 dendro; said water-soluble emulsifier being selected from the group consisting of ethoxylated lanolin alcohols and ethoxylated hydrogenated lanolin, the degree of ethoxylation of said water-soluble emulsifier being in the range of about 16 to 24 dendro; and, said mineral oil, water and emulsifiers being in amounts appropriate to form a gel.

2. A transparent gel according to claim 1 wherein the degree of ethoxylation in the oil-soluble emulsifier is 2 dendro and the degree of ethoxylation in the water-soluble emulsifier in 20 dendro.

3. A transparent gel according to claim 1 wherein the water-soluble emulsifier is ethoxylated hydrogenated lanolin.

4. A transparent gel according to claim 1 wherein the water-soluble emulsifier is ethoxylated lanolin alcohols.

5. A transparent gel according to claim 1 wherein the oil-soluble emulsifier is ethoxylated oleyl alcohol.

6. A transparent gel according to claim 1 wherein the oil-soluble emulsifier is an ethoxylated oleyl-cetyl alcohol mixture wherein the oleyl alcohol in the oleyl-cetyl alcohol mixture is in an amount of at least 70% by weight of the mixture.

7. A transparent gel according to claim 1 wherein the water-soluble emulsifier is ethoxylated hydrogenated lanolin and the oil-soluble alcohol is an ethoxylated oleyl-cetyl alcohol mixture.

8. A transparent gel according to claim 1 wherein the mineral oil is of the higher viscosity type having a viscosity of at least 180 Saybolt seconds.

9. A transparent gel according to claim 1 which additionally contains a coupling agent selected from the group consisting of hexylene glycol, 2-ethyl-1,3-hexanediol, 2-methyl-2-ethyl-1,3-propanediol, glycerine, polyethylene glycol 600, polyethylene glycol 1500, propylene glycol monomethyl ether, dipropylene glycol monomethyl ether, isopropylidene glycerol, and dipropylene glycol.

10. A transparent gel according to claim 9 wherein the coupling agent is 2-ethyl-1,3-hexanediol.

References Cited by the Examiner
UNITED STATES PATENTS

| 2,309,722 | 2/1943 | Wilkes et al. | 167—91 |
| 3,101,300 | 8/1963 | Siegal et al. | 167—87 |

OTHER REFERENCES

Wagner: American Perfumer, vol. 75, No. 7, pp. 23–26 (1960).

JULIAN S. LEVITT, *Primary Examiner.*